US007593827B2

(12) United States Patent
Kambe et al.

(10) Patent No.: US 7,593,827 B2
(45) Date of Patent: Sep. 22, 2009

(54) USB TRANSDUCER FOR MEASUREMENT SIGNALS

(75) Inventors: Shiro Kambe, 2-2-62, Rinsenji, Yonezawa-shi, Yamagata, 992-0062 (JP); Hiroshi Yoshimori, Shinjo (JP); Hitoshi Mizuguchi, Shinjo (JP); Kazunori Ito, Shinjo (JP); Nobuya Kakizaki, Shinjo (JP)

(73) Assignees: Shiro Kambe, Yonezawa-shi (JP); DKK-TOA Yamagata Corporation, Shinjo-shi (JP)

( * ) Notice: Subject to any disclaimer, the term of this patent is extended or adjusted under 35 U.S.C. 154(b) by 0 days.

(21) Appl. No.: 11/703,283

(22) Filed: Feb. 6, 2007

(65) Prior Publication Data

US 2007/0185680 A1 Aug. 9, 2007

(30) Foreign Application Priority Data

Feb. 8, 2006 (JP) ............................ 2006-031646

(51) Int. Cl.
*G06F 15/00* (2006.01)

(52) U.S. Cl. ...................... 702/127; 702/178; 702/188; 713/300

(58) Field of Classification Search ................. 702/104, 702/127, 188, 189, 178; 713/300
See application file for complete search history.

(56) References Cited

U.S. PATENT DOCUMENTS 6,836,747 B2 * 12/2004 Suzuki ...................... 702/178
2005/0234681 A1 * 10/2005 Johnson et al. ............ 702/188
2005/0240784 A1 * 10/2005 Sugasawa .................. 713/300

FOREIGN PATENT DOCUMENTS

JP 2004-260380 9/2004
JP 2005-148874 6/2005

OTHER PUBLICATIONS

JP 2005-148874 (Hayashi, Shigeki), Pubn-Date: Jun. 9, 2005, English translation.*
Niimi, Yoshihisa et al., Tokogawa Technical Reporting, vol. 44, No. 1, 2000, pp. 19-24.
http://www.ocs-lv.co.jp/LabVIEW/Sub3_5.htm, Feb. 2006.
http://toyonakakeisou.com/02FA/01Keisoku/01/Keisoku.htm, Feb. 2006.
English summary of "Other Documents".
Partial Translation of Office action of JP2006-031646.
Patent Abstracts of Japan, 2005-148874, published on Jun. 9, 2005 in the name of Hayashi.
Patent Abstracts of Japan, 2004-260380,published on Sep. 16, 2004, in the name of Suzuki.

* cited by examiner

*Primary Examiner*—John H Le
(74) *Attorney, Agent, or Firm*—Christie, Parker & Hale, LLP

(57) ABSTRACT

A USB transducer includes: an input section which receives a measurement signal from a measuring device; a controller which converts measurement data into digital data and further converts the digital data into data ready for processing by a computer; and an output section having a USB connection terminal for outputting the data generated by the controller to the computer by using a USB cable, and for receiving a control signal from the computer.

4 Claims, 9 Drawing Sheets

USB TRANSDUCER FOR MEASUREMENT SIGNALS

CROSS-REFERENCE TO RELATED APPLICATION

This application claims priority of Japanese Patent Application Number 2006-031646, filed on Feb. 8, 2006.

FIELD OF THE INVENTION

The present invention relates to a transducer for measurement signals measured by a sensor and, more particularly, relates to a USB transducer which transmits measurement signals to a USB terminal of a computer through a USB cable.

BACKGROUND OF THE INVENTION

In the field of equipment for environmental analysis, process analysis, laboratory analysis, and industrial analysis, measuring instruments and measuring systems that display measurement signals measured by various kinds of sensors or that convert the signals into an analog output for transmission are generically called transducers. Generally, such transducers are provided with switches or like operating parts for making settings for the transducer itself or for controlling the sensor.

FIG. 7 shows a prior art transducer. In the figure, the transducer 10 is connected to a sensor 11 and external power supply 12, and the output of the transducer 10 is coupled to a computer 14 via an A/D converter 13, if necessary. The transducer 10 comprises a measuring section 101 for making measurements, an operation section 102 having switches or the like, and a display section 103 for displaying measurement data.

The measuring operation in FIG. 7 will be described step by step. First, the sensor 11 is set ready for the measurement. After that, power is turned on to the transducer 10. Next, the transducer 10 is placed in a setup mode, and various settings, such as the setting of upper and lower set values for the measurement range, the setting of alarm set points, the setting for temperature compensation, and the setting of response speed, are made from the operation section 102 of the transducer 10. When the measurement setup of the transducer 10 is completed, the transducer 10 is placed in a measurement mode to start the measurement. Measurement data is transmitted from the sensor 11 and displayed on the display section 103. Then, the transducer 10 is switched to a transmission mode to transmit the measurement data to the computer 14 for analysis.

In the prior art, analog transmission (DC 4 to 20 mA, etc.) or serial data communication such as RS-232C has been used as a method for transmitting the measurement data from the transducer to the computer.

In the case of analog transmission, the A/D converter 13 for converting the data into a digital signal must be provided as shown by dashed lines, thus requiring the use of an extra device before connection to the computer 14.

In the case of serial communication using RS-232C, the A/D converter is not needed, but few instruments are equipped with RS-232C and, if equipped with RS-232C, such instruments are often expensive; for this reason, in the field of equipment for environmental analysis, process analysis, laboratory analysis, and industrial analysis, measuring systems using RS-232C are not prevalent (reference document 1).

Another method of transmission is one that uses the GPIB (General Purpose Interface Bus) interface. This interface allows a number of devices to be connected in a daisy chain on a single bus. However, equipment that uses this interface system is bulky, its volume being as large as 100 $cm^3$ or more, and requires the use of an independent power supply. GPIB ensures reliable data transmission by using a method called three-wire handshaking. While reliable data transmission can be achieved, GPIB is slow in such cases as when a setup operation and a measurement value read operation are repeated. (Reference document 2)

There is a high-speed version of GPIB, but this is intended for the transmission of large volumes of data (such as waveform data). Further, the cable length of GPIB is specified in the standard, and the expensive cable is usually rugged and bulky.

In the prior art, when processing a plurality of measurement data by computer, a plurality of arrays of sensors 11*a* to 11*e*, transducers 10*a* to 10*e*, and computers 14*a* to 14*e* have been arranged as shown in FIG. 8, and the processing has been performed using a data management device 15. As a result, the overall system becomes large, causing problems in terms of space and cost. (Reference document 3)

Furthermore, it has not been possible to control the transducer 10 from the computer 14, and power has had to be supplied externally.

Reference document 1: Yokogawa Technical Report, Vol. 44, No. 1, 2000, pp. 19-24.

Reference document 2: http://www.ocs-1v.co.jp/LabVIEW/Sub3_5.htm

Reference document 3: http://toyonakakeisou.com/02FA/01Keisoku/01Keisoku.htm

SUMMARY OF THE INVENTION

There are various limitations when using the prior art transducer 10 by incorporating it into other equipment, and these limitations have impeded the incorporation of the transducer into other equipment. For example, as measurement values are checked using a display meter or a digital display, and various settings and operations are performed using buttons or keys on the system, the transducer has had to be mounted in a surface section of an instrument. FIG. 9 shows an example in which the transducer 10 is mounted by cutting a panel 16. Reference numeral 17 is a fixing device for fixing the transducer in place.

In this way, design freedom in terms of the incorporation of the measuring system has been greatly limited.

Further, when using a personal computer to process and analyze the data measured by the prior art measuring system, as the measurement value is output in the form of an analog signal in the prior art transducer, the signal has had to be converted into a digital signal for input to the personal computer. This has led to the problem that the accuracy of the measurement value decreases due to a conversion error associated with the signal conversion. Furthermore, this prior art system also has required the use of an A/D converter, resulting in an increase in cost.

There has also been the following problem. Conventionally, software has been provided to users in a general-purpose standardized form. On the other hand, user requests vary widely, and it is strongly requested by users that application software be made customizable, demanding that the source code of the special application software be disclosed. However, disclosure of the source code has involved difficult problems, as the disclosure means disclosing information including know-how. For such reasons, the user requests have not been adequately addressed.

It is an object of the present invention to solve the above problems associated with the prior art measuring system. More specifically, the invention is directed to the provision of a user-friendly system that ensures freedom for incorporating the measuring system into other equipment, reduces the conversion error associated with the signal conversion, reduces the cost of the A/D converter, and allows simultaneous processing of a plurality of data, while also addressing the user request for customization of application software.

[Means for Solving the Problems]

In view of the above technical problems, the system of the present invention is constructed so that measurement signals from various kinds of measuring instruments, for example, equipment for environmental analysis, process analysis, laboratory analysis, industrial analysis, or the like, can be directly coupled to a USB terminal of a computer, thereby making it possible to observe, record, and store the results of the measurements and to analyze the data. In this configuration, the transducer can be controlled by a control signal supplied from the computer via the USB cable, and power for the transducer can also be supplied from the computer. The invention thus achieves a system that processes a plurality of measurements simultaneously and analyzes the plurality of measurement data using a single computer.

According to a first mode of the present invention, there is provided a USB transducer comprising: input means for taking a measurement signal from a sensor; output means for transferring signals to and from an external computer via a USB cable; and signal processing means for processing the measurement signal as well as a signal transferred from the external computer.

According to a second mode of the present invention, the signal processing means according to the first mode includes: a CPU which receives the measurement signal from the sensor, converts the measurement signal into a digital signal, performs processing based on a command signal from the computer, and performs processing for converting the digital signal into measurement data; and a controller which converts the data into data ready for processing by the computer, and which converts the signal transferred from the external computer into a signal format ready for processing by the CPU.

According to a third mode of the present invention, the USB transducer according to the first or second mode is configured so that power for the USB transducer is supplied from the computer through the USB cable.

[Effect of the Invention]

Using the USB cable, signal transmission/reception and supply of power can be accomplished using a single cable connection. Thus, according to the present invention, not only can the measurement data be displayed on the computer display, but various settings for measurements can also be made on the computer while confirming the settings on the screen of the computer connected to the device of the present invention. Since power, for example, DC power (DC5V, 500 mA), necessary for the operation of the transducer is supplied from the computer, there is no need to provide a separate power supply.

Further, when incorporating the device (USB transducer) of the present invention into other equipment, since there is no need to provide setting/operation keys, display meter, digital display or the like on the device, and since the size of the device is small, no limitation is imposed when incorporating the device into other equipment, and thus the design freedom in terms of the shape and mounting of the device can be greatly enhanced.

As the signal that the device of the present invention outputs for transmission to the computer is a digital signal, the output of the device of the present invention is not converted and, therefore, provides a highly accurate measurement signal. There is also no need to provide an extra device such as an A/D converter.

Furthermore, most computers (both desktop and notebook types) currently sold on the market are fitted with terminals for USB connection, which is thus the most prevalent connection method.

In the case of the prior art transducer, there are cases where, depending on the quality of the power supply in the actual operating environment, the transducer is affected by external perturbations such as excessive noise, leading to malfunctioning of the transducer; on the other hand, when USB cable is used, stable operation of the transducer can be achieved because the quality of the power supplied from the computer is assured by the computer (USB interface) technical standard. Furthermore, the invention can achieve a system that makes a plurality of measurements simultaneously and performs data processing to analyze the plurality of measurement data using a signal computer.

BRIEF DESCRIPTION OF THE DRAWINGS

The above object and features of the present invention will be more apparent from the following description of the preferred embodiments with reference to the accompanying drawings, wherein.

DETAILED DESCRIPTION OF THE PREFERRED EMBODIMENTS

Embodiments of the present invention will be described below with reference to the drawings.

Figure 1:
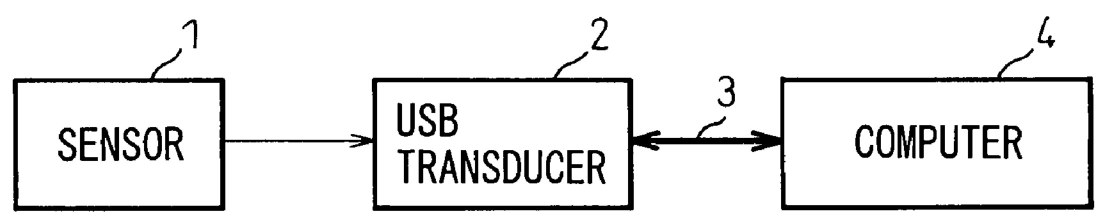
FIG. 1 is a block diagram showing how a USB transducer according to the present invention is connected to a sensor and a computer.

FIG. 1 is a diagram showing a measuring system that uses a USB transducer according to the present invention. The output of a sensor 1 is connected to the USB transducer 2 whose output, in turn, is connected to a computer 4 by means of a USB cable 3. A measurement signal from the sensor 1 is input to the USB transducer 2, which then transfers the measurement signal to the computer 4. At the same time, the computer 4 is configured to be able to set up the operation of the USB transducer 2 by sending the commands through the USB cable, check the measurement value, provide an instruction for computation, and process the data for analysis. Power for the transducer 2 is supplied from the computer 4 through the USB cable 3.

Figure 2:
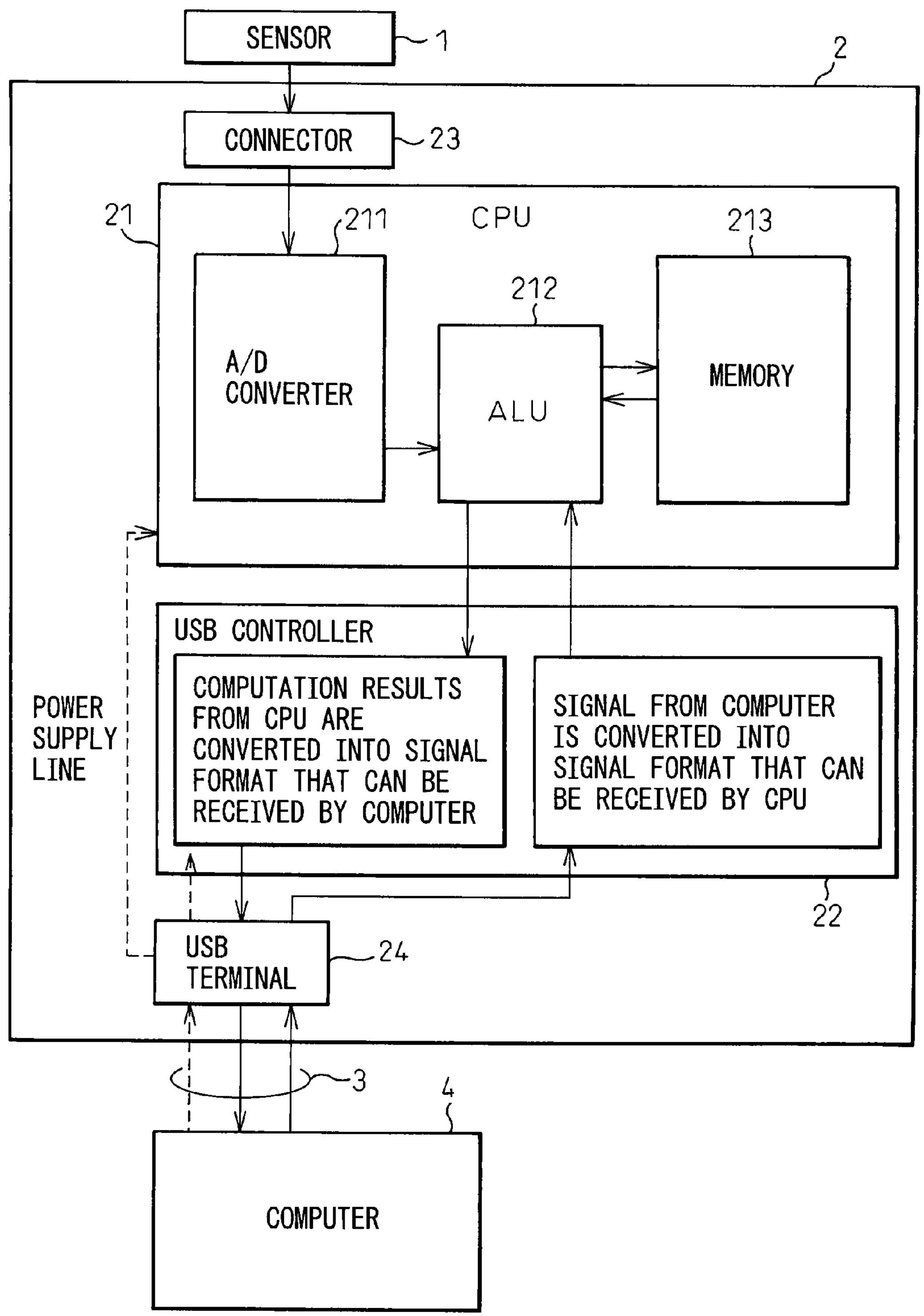
FIG. 2 is a block diagram of the USB transducer according to the present invention.

FIG. 2 shows the configuration of the USB transducer 2 of the present invention. The USB transducer 2 includes an input connector 23 as an input means, a CPU 21 and a USB controller 22 as signal processing means for processing signals, and a USB terminal 24 as an output means.

The CPU 21 is connected to the USB controller 22, and the USB controller 22 is connected to the USB terminal 24. The USB terminal 23 is connected to the computer 4 via the USB cable 3.

The measurement signal from the sensor 1 is input to the CPU 21, transferred through the USB controller 22 and the USB terminal 23, and sent to the computer 4 through the USB cable 3. The signal from the computer 4 is transferred through the USB cable 3 and the USB terminal 23 and input to the USB controller 22 and the CPU 21. In the figure, dashed lines indicate power supply lines over which the computer 4 supplies power to the USB transducer 2.

The CPU 21 includes an A/D converter 211, a computation circuit 212, and a memory 213. The A/D converter 211 is connected to the computation circuit 212 which in turn is connected to the memory 213. The analog measurement signal from the sensor is converted by the A/D converter 211 into a digital signal which is supplied to the computation circuit 212. The computation circuit 212 performs computation, for example, for converting the digital signal into measurement data by using the output of the A/D converter 211 and the data and program stored in the memory 212, and stores the result of the computation in the memory 213 or supplies the result to the USB controller 22. An identifier for identifying the transducer 2, instrument set values, and firmware for the transducer are prestored in the memory 213.

Each transducer has an identifier for uniquely identifying the transducer, and the identifier unique to the transducer 2 is prestored in the memory 213. Using this identifier, the computer 4 can switch the mode between setup, measurement, and transmission for each individual one of transducers 2*a* to 2*e* when making different kinds of measurements (for example, pH and ORP measurements), and can make various settings and manage the measurement for each individual transducer.

The quantity to be measured is predetermined for each transducer 2 and, to make this distinction, an identifier indicating the quantity to be measured by the transducer 2 is prestored in the memory 213.

The USB controller 22 converts the result of the computation received from the CPU 21 into a signal format that can be received by the computer 4, and outputs the signal via the USB terminal 23 onto the USB cable 3 for transmission to the computer 4. Conversely, the signal from the computer 4 is converted into a signal format that can be received by the CPU, and sent to the USB transducer 2 via the cable 3 and via the USB terminal 24.

Figure 3:
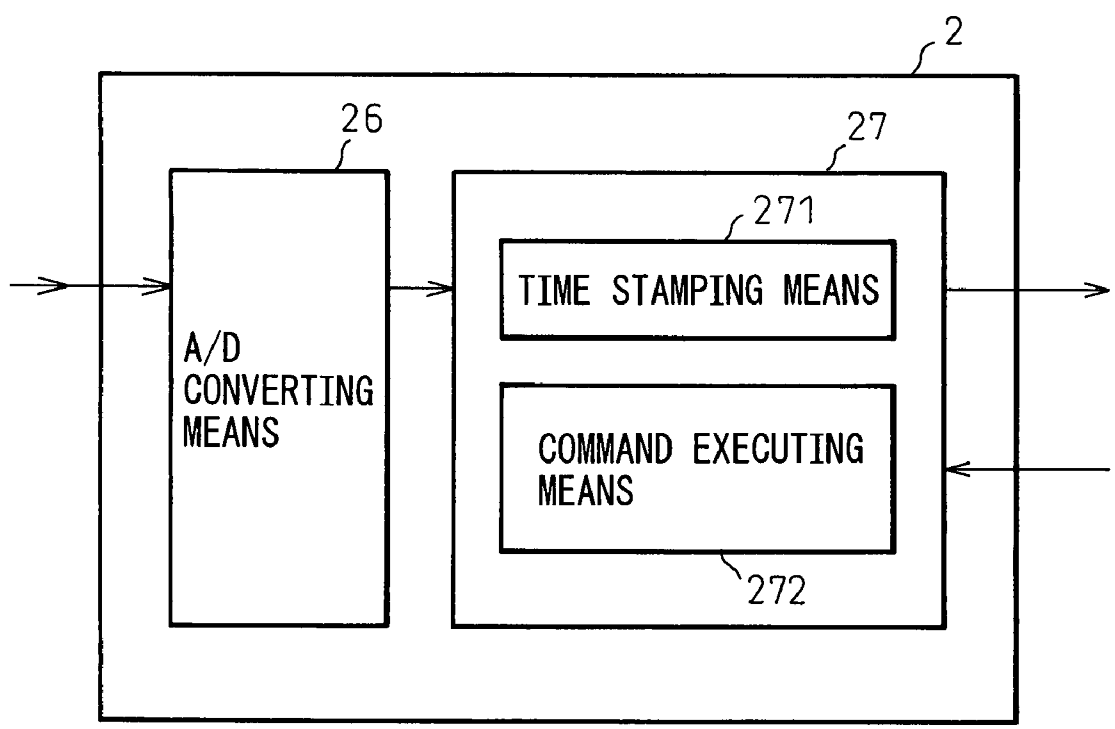
FIG. 3 is a functional block diagram of the USB transducer according to the present invention.

FIG. 3 is a block diagram showing a functional representation of the USB transducer 2 of the present invention. The USB transducer 2 includes at least an A/D converting means 26 and a functional means 27. The functional means 27 comprises at least a time stamping means 271 and a command executing means 272.

The A/D converting means 26 converts the analog measurement signal received from the sensor into a digital signal and is identical to the A/D converter 211 shown in FIG. 2.

The time stamping means in the functional means 27 measures the measurement time 271 and appends a time stamp to the measurement data.

The command executing means 272 interprets a command received from the computer, and executes the command in the transducer 2. Commands to be executed here include, for example, commands for alarm setting, measurement range setting, timer and other device setting, etc. and commands for performing computation for correcting the measurement data.

One feature of the USB transducer configuration according to the present invention is that all the functions and instructions necessary for controlling the USB transducer are predefined as commands (instruction words) for the user and that the means (command executing means) is provided for executing the commands. In the present invention, a command means a process to be executed in the transducer.

Usually, when controlling a device by using software, the contents of a command (describing the action and mathematical equation to be performed by the command) are directly written to a control program. In this case, the contents of the command (in particular, the mathematical equation and numeric value correcting means) may contain important know-how, and often, such contents cannot be disclosed to general users.

As a result, the user cannot create a control program specific to his use. If, for example, the mathematical equation is disclosed, unpredictable computation results can occur unless the user correctly understand the mathematical equation.

In view of this, the present inventors have devised a method in which instruction statements for setting conditions and the processing of a plurality of equations are predefined as single-line commands (instruction words) and the process to be executed by each particular command is stored in a memory within the transducer so that a control program can be executed by specifying the instruction word. With this method, an environment necessary for the construction of an application program can be provided to the user without disclosing the condition settings, important equations, and the details of computation.

As earlier described, there are two kinds of commands, one concerning transducer setting and the other describing the details of computation. In practice, the command executing means is configured to store in a program area within the memory 213 a program that executes an instruction in response to each particular command, and to cause the computation circuit 212 to execute the command.

In the above configuration, when a command is sent to the USB transducer 2 from the computer 4, the command is executed using the computation means 212 and the program stored in the memory of the transducer 2.

Examples of transducer commands for pH measurement are shown below.

1. Examples of condition setting commands

OFFSET:

Set electromotive force corresponding to pH=7, and store the set value in memory.

CRACK:

Set electrode crack detection function and store the setting in memory.

2. Examples of computation commands

CAL:

For example, a true value C which is a value effective as measurement data is obtained by subtracting correction value B, an offset value, from the measurement value A measured by the sensor 1; here, when a user command CAL for true value calculation is issued from the computer 4, the operation C=A−B is performed in the USB transducer 2.

TEMP_COMP:

This command sets the sample solution temperature compensating function for the pH value, and stores the setting in memory. The sample solution temperature compensating function compensates for the pH-temperature characteristics of the sample solution, and the pH value is compensated for temperature in accordance with the following equation.

pH value after compensation=Raw pH value−(Solution temperature−25° C.)×Solution temperature compensation coefficient In the above equation, the solution temperature compensation coefficient represents the amount of change of the pH value for a temperature change of 1° C. This coefficient value varies from one sample solution to another.

Next, an operation will be described referring to FIG. 2. First, when the USB transducer 2 of the present invention is connected to the computer 4 via the USB cable 3, operating power is supplied to the transducer 2 which is thus started up. Thereupon, the transducer identifier and the sensor identifier are automatically sent to the computer 4. Next, the USB transducer 2 is placed in a setup mode by a command from the computer 4, and receives the various setting commands from the computer 4 to make necessary settings, thus becoming ready for measurement.

When the setup for the measurement is completed, the USB transducer 2 is placed in a measurement mode by a command from the computer 4. In this mode, the sensor 1 makes the prescribed measurement. The signal measured here is an analog signal, which is sent to the USB transducer 2 where the analog signal is converted by the A/D converting means 22 into a digital signal. Further, in the CPU 21, using the data and program prestored in the memory 213 the computation means 212 corrects the digital signal for changes in temperature and for individual differences of hardware by performing computation under the conditions prespecified by the user, and outputs the final measurement data. That is, the A/D-converted digital signal is based, for example, on the voltage of the electromotive force generated from the sensor and, when measuring the pH, the digital signal is converted to the pH value corresponding to the voltage value, and computation for correction, etc. is performed. On the other hand, the time stamping means 271 measures the measurement time, and appends to the digital signal a time stamp that indicates the time of the measurement (FIG. 3).

The signal is then output from the USB transducer 2, passes through the USB cable 3, and is input to the computer 4.

When the user corrects the measurement value, for example, the pH value, by temperature compensation, the TEMP_COMP command is sent to the transducer 2 from the application software running on the computer 4. The computation means 212 in the CPU 21 then recognizes the TEMP_COMP command from among the commands prestored in the memory 213, and performs the specified computation (action) to execute the temperature compensation in accordance with the previously made setting. Likewise, when any particular command is sent to the transducer 2 from the application software running on the computer 4, the command is recognized and the specified function or computation is executed in the transducer 2. The result of the execution is stored in the memory 214 or sent to the computer 4 via the USB controller.

Figure 4:
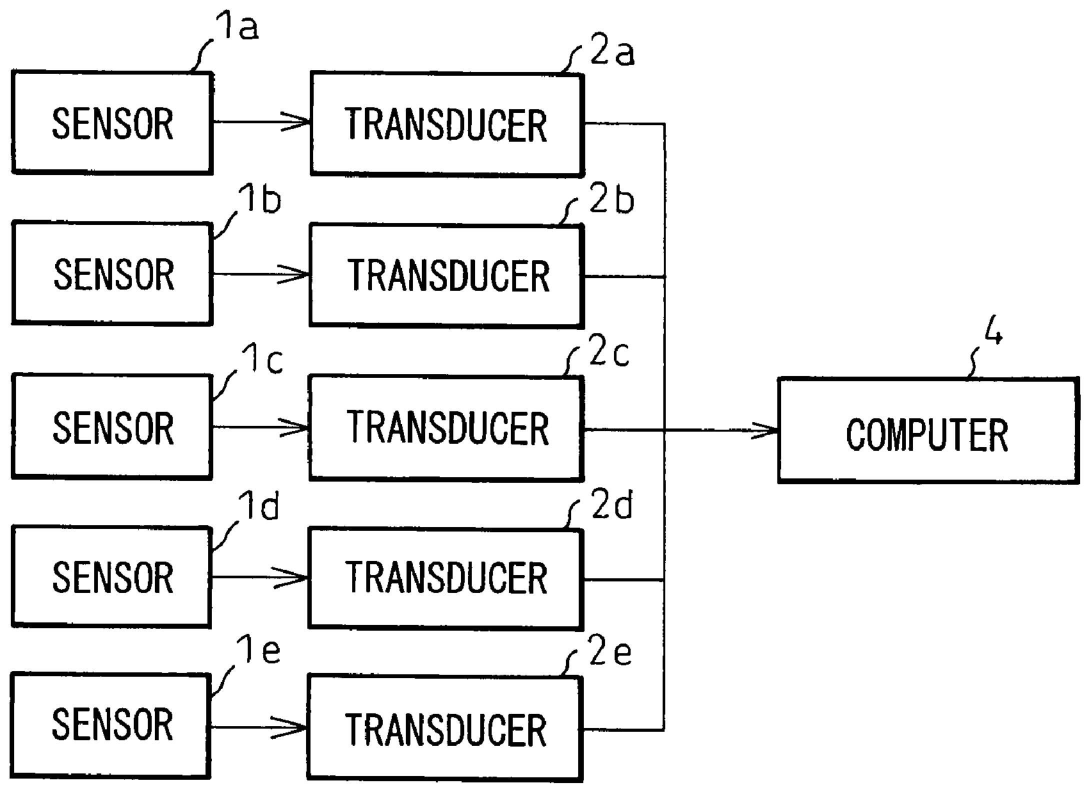
FIG. 4 is a block diagram showing an arrangement for connection of USB transducers, sensors, and a computer when making a plurality of measurements.

FIG. 4 shows a configuration in which a plurality of transducers 2*a* to 2*e* are connected to one computer 4. Using the transducer identifiers earlier described, the computer 4 can automatically identify the plurality of connected transducers 2*a* to 2*e* and manage the respective measurement data. In the illustrated example, five transducers are connected. In the preferred embodiment of the invention, up to 12 transducers, for example, can be automatically identified. The transducers can be handled without having to be aware of the type of sensor (the quantity to be measured). The transducer identifiers may be used in combination with the sensor identifiers to further enhance the reliability with which the quantities to be measured are identified.

Figure 5:
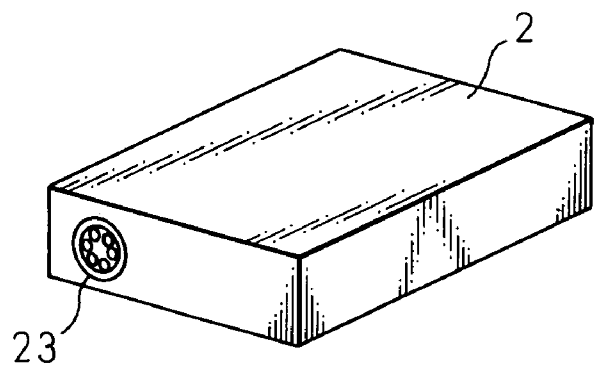
FIG. 5 is a perspective view showing the external appearance of the USB transducer of the present invention.

FIG. 5 is a perspective view showing the external appearance of the USB transducer 2, and reference numeral 23 indicates an input means via which a signal from the sensor is input, i.e., a connector to which a signal line from the sensor is connected. On the opposite side from the connector 23, there is provided an output means of the USB transducer 2, that is, a connector (USB terminal 24) for connecting to the USB cable (this connector is not shown here, as it is a connector well known to any person skilled in the art).

Figure 6A:
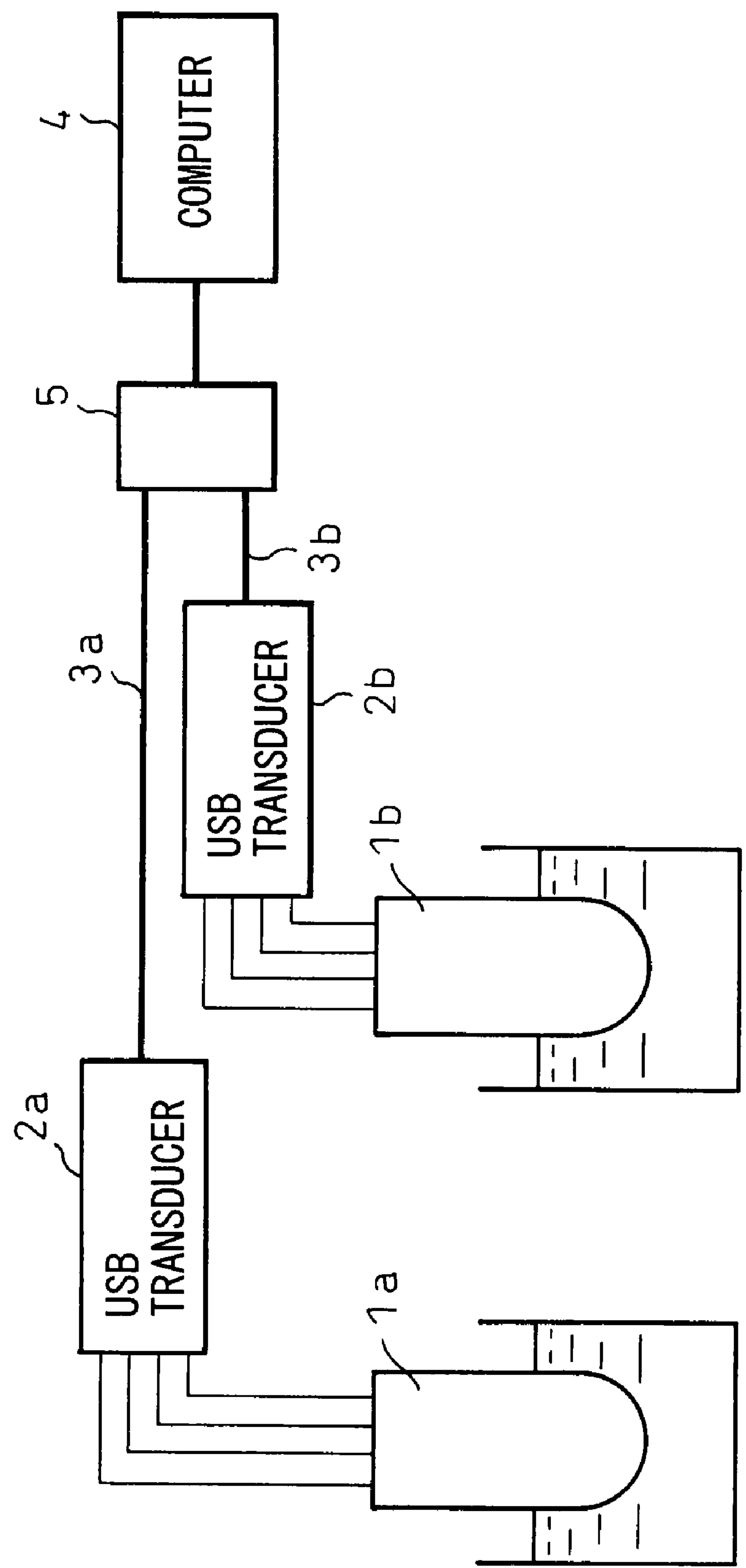
FIG. 6A is a diagram showing connections for pH and ORP measurements using the USB transducer of the present invention.
Figure 6B:
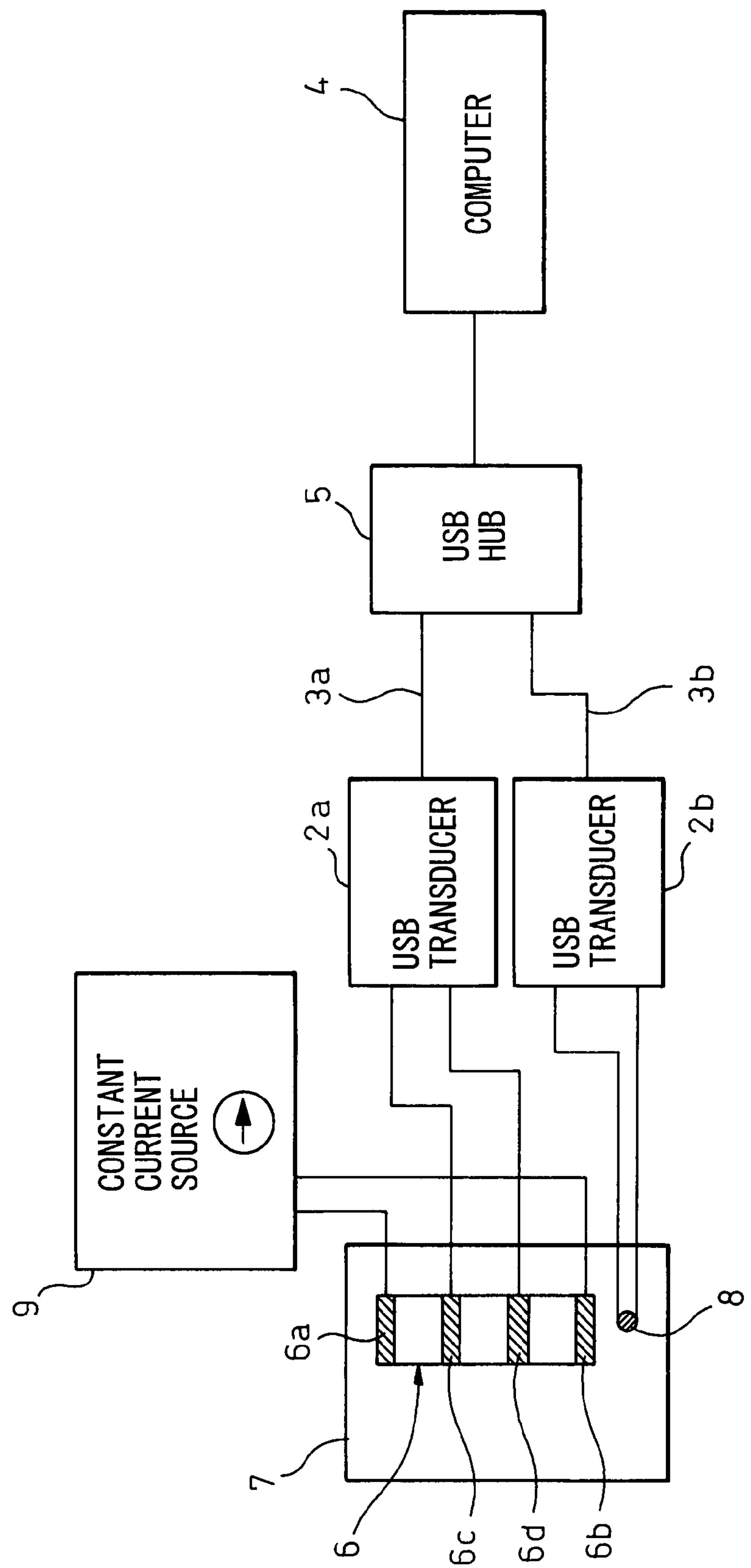
FIG. 6B is a diagram showing connections for resistance/temperature measurement using the USB transducers of the present invention.
Figure 7:
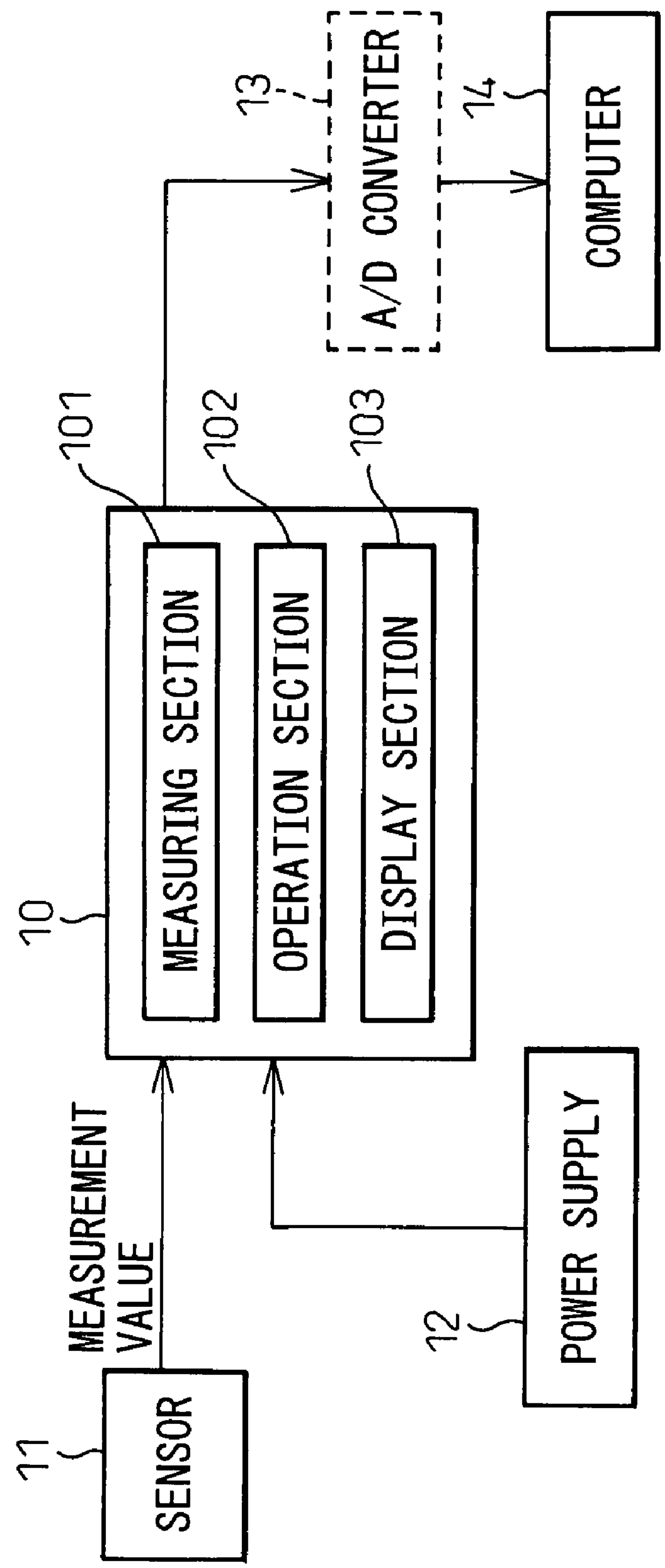
FIG. 7 is a diagram showing the configuration of a prior art transducer and its connections to a sensor and a computer.
Figure 8:
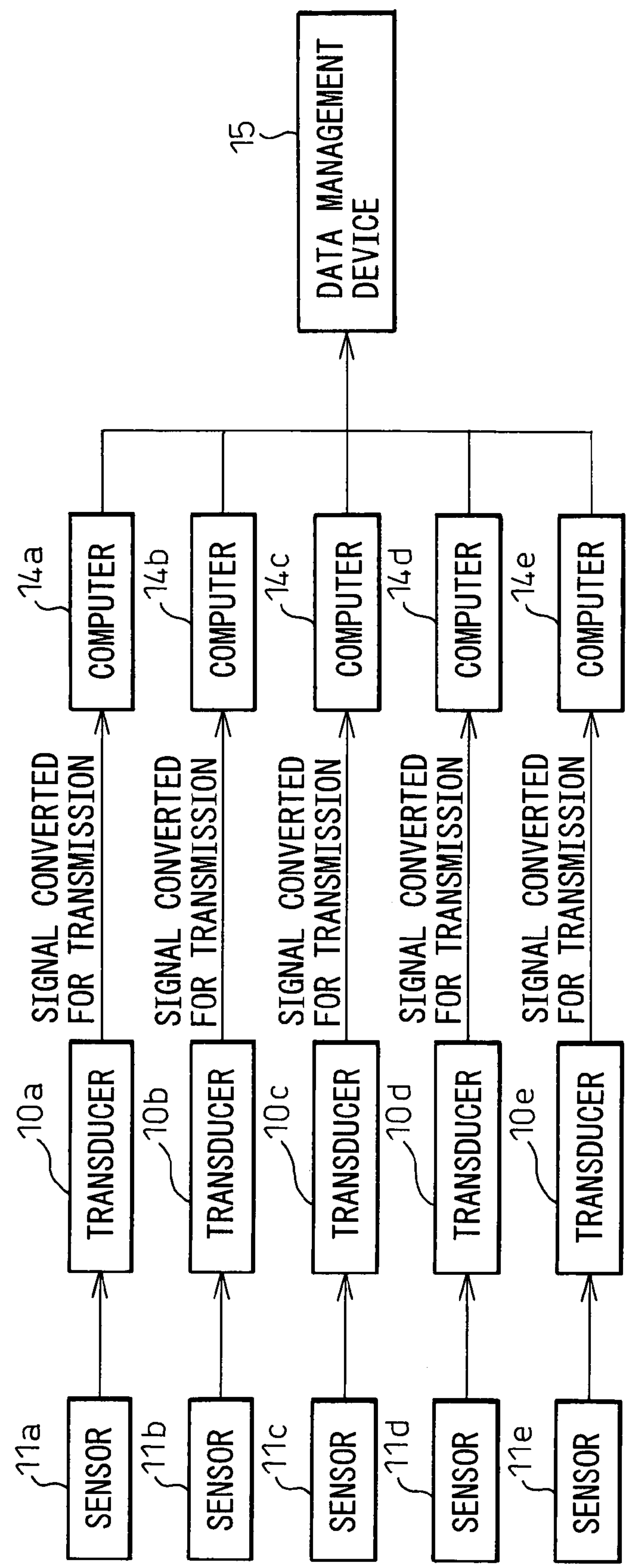
FIG. 8 is a block diagram showing an arrangement for connection of USB transducers, sensors, computers, and a data management device when making a plurality of measurements according to the prior art.
Figure 9:
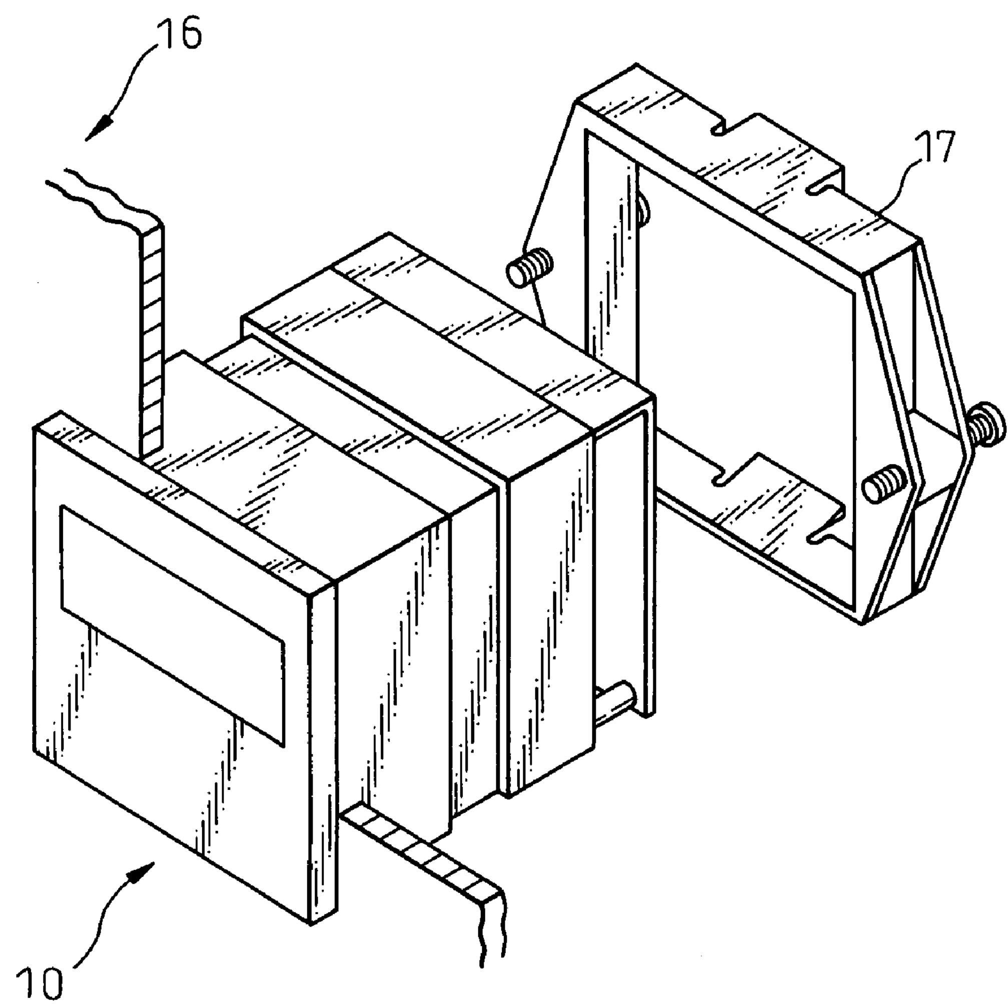
FIG. 9 is a perspective view for explaining the condition in which the prior art transducer is mounted in another equipment.

FIGS. 6A and 6B show application examples that use the transducers of the present invention.

In FIG. 6A, two USB transducers (2*a* and 2*b*) according to the present invention are used to measure the measurement data received from a pH sensor 1*a* and an ORP (Oxidation Reduction Potential) sensor 1*b*. The input terminals of the USB transducers 2*a* and 2*b* are connected to the pH sensor 1*a* and the ORP sensor 1*b*, respectively. The output terminals are connected to the computer 4 via respective USB cables 3*a* and 3*b* and via a hub 5.

The USB transducer 2*a* connected to the pH sensor 1*a* is a dedicated transducer for the pH sensor, and the USB transducer 2*b* connected to the ORP sensor 1*b* is a dedicated transducer for the ORP sensor. Accordingly, the computer 4 can automatically identify the type of each USB transducer.

In the figure, the measurement signal from each sensor, which includes temperature data, is sent to the corresponding USB transducer through four lines. In this configuration, the pH of the solution, the temperature of the solution, and the ORP measurement data taken from the solution whose ORP is measured are simultaneously read into the computer 4 and displayed on the display of the computer 4. The illustrated example has shown as an example the configuration in which two sensors, the pH sensor and the ORP sensor, are connected, but it will be appreciated that only one sensor may be used. It is also possible to use a dissolved oxygen (DO) sensor as the sensor. In that case, a USB transducer dedicated for the dissolved oxygen (DO) sensor is used, as a matter of course. Here, as data measured by the dissolved oxygen (DO) sensor is influenced by solvent temperature and chloride ion concentration, compensation buttons for selecting solvent temperature and chloride ion concentration compensation methods to compensate for the data can be added on the display (not shown) of the computer 4.

With the traditional RS-232C interface, because of its specification, it has been difficult to read two or more measurement signals simultaneously into a computer. Further, while a system similar to the one of the present invention can be constructed using a GPIB interface, the interface and the cable are generally expensive and, if a plurality of data are to be captured simultaneously and displayed on the computer, a special program for that purpose has had to be created.

According to the present invention, as the plurality of USB transducers in accordance with the present invention can be easily connected to one computer using a commercially available USB hub, and as each transducer can be automatically identified at the computer end and each measurement data can be automatically measured, displayed, and stored, there is no need to create a special program for that purpose. As the time of the measurement is appended to each measurement data, the variation of the data can be automatically displayed. Further, the computer can analyze the measurement data by effectively using the time data. Furthermore, as the power for the USB transducer is supplied from the computer, and the transducer body is small for this type of transducer, the space required for conducting an experiment can be saved. In the experiment conducted here, a computer, two USB transducers, a USB hub, a pH sensor, and an ORP sensor were arranged on a desk measuring 30 cm by 60 cm. After connecting the USB cables, the three parameters, i.e., the pH, the temperature of the pH solution, and the ORP were read at intervals of one second, and the parameters were able to be displayed simultaneously on the display (not shown) and recorded.

FIG. 6B shows an example in which a specimen resistance/temperature measuring instrument is constructed using two USB transducers (2*a* and 2*b*) of the present invention dedicated for voltage and temperature sensors, respectively. The resistance/temperature measurement here means measuring a change in the resistance value of the specimen with respect to a change in temperature.

In FIG. 6B, reference numeral 6 designates the test specimen for the resistance/temperature measurement. This is, for example, a rectangular specimen measuring 1 cm in length, and 5 mm in width 3 mm in thickness (top view). Vapor deposition electrodes 6*a* and 6*b* are respectively formed on the upper and lower ends of the specimen 6, and two vapor deposition electrode bands 6*c* and 6*d*, each encircling the specimen 6, are formed at two positions spaced apart in the height direction. This specimen 6 is placed in a thermostatic chamber 7, and a constant current source 9 is connected to the electrodes 6*a* and 6*b*. A temperature sensor 8 is placed inside the thermostatic chamber 7.

The first USB transducer 2*a* is connected to the electrode bands 6*c* and 6*d* of the specimen 6 via cable 10*a* and 10*b*, and the second USB transducer 2*b* is connected to the temperature sensor 8 via cables 11*a* and 11*b*. The first and second USB transducers are dedicated USB transducers for the voltage and temperature sensors, respectively. Their outputs are connected to a hub 5 via the respective USB cables 3*a* and 3*b*, and the output of the hub 5 is connected to the computer 4 via a cable 12.

The resistance and temperature of the specimen 6 are measured while supplying, for example, a direct current of 1 μA to 1 A from the constant current source 9 in the direction directed from the electrode 6*a* toward the electrode 6*b*.

For the resistance/temperature measurement of the specimen 6, the temperature sensor 8 is placed in close proximity to the specimen 6, and the terminal voltage between the two vapor deposition electrode bands 6*c* and 6*d* of the specimen 6 is transmitted to the second USB transducer 2*b* and, via the USB hub 5, on to the computer 4 which displays the voltage on the display (not shown) connected to the computer 4.

The type of each USB transducer (in this case, the dedicated USB transducers for the voltage and temperature sensors) is automatically identified by the computer, and the measurement data received from the first USB transducer 2*a* and second USB transducer 2*b* are automatically and periodically measured, displayed, and stored in a memory (not shown) by the computer. In the example of the USB transducer that the inventor fabricated in accordance with the present invention, the measurement was successfully made with a particular value within the range of −100 V to 100 V, for example, with 50 V, and the accuracy of the measurement was 1 mV.

On the other hand, the level of the temperature measurement signal that the second USB transducer outputs differs depending on the type of the temperature sensor 8 (for example, when the temperature sensor is a thermocouple sensor, the measurement temperature range and the accuracy vary depending on the type of the thermocouple (B, R, S, N, K, etc.); therefore, voltage versus temperature calibration must be done for each type of sensor. For this purpose, a set button for selecting the type of thermocouple can be added on the screen of the computer display.

Further, by clicking on an electrode crack detection function on the computer, a fault condition can be detected immediately when a break occurs in the thermocouple.

INDUSTRIAL APPLICABILITY

In the field of equipment for environmental analysis, process analysis, laboratory analysis, and industrial analysis, the applicability of the present invention is enormous, because measurement data can be directly handled by a computer and because a plurality of data can be processed simultaneously. Furthermore, as the transducer of the present invention is compact in construction and does not require the provision of a dedicated power supply, design freedom when incorporating the transducer into a system is enhanced, which greatly facilitates the construction of the system. It has been verified as described above that the present invention is particularly useful for applications where the transducers are connected to a pH sensor, an ORP sensor and voltage and temperature sensors.

The invention claimed is:

1. A USB transducer for measurement comprising:
- a connector for receiving measurement signals from a sensor;
- a USB terminal for sending and receiving data through a USB cable to and from an external computer; and
- a CPU comprising;
  - an A/D converter for converting said measurement signals into digital measurement data,
  - a memory including a preset program corresponding to commands to be executed on the digital measurement data in the USB transducer and commands to preset monitoring functions of said sensor,
  - a computation circuit for executing a selected process from the processes in the preset program for processing the digital measurement data according to a command received from said external computer, processing the digital measurement data from the A/D converter according to the selected process, and outputting the processed data, and
  - a USB controller for receiving the processed data, transforming data format of the processed data and sending the transformed data to said external computer.

2. A USB transducer as claimed in claim 1, wherein said memory further stores a program for compensating the digital measurement data.

3. A USB transducer as claimed in claim 1 or 2, wherein said USB cable provides power for said USB transducer from said external computer.

4. A USB transducer for measurement comprising:

connection means for receiving measurement signals from a sensor;

terminal means for sending and receiving data through a USB cable to and from an external computer; and data processing means comprising;

A/D conversion means for converting said measurement signals into digital measurement data, storage means including a preset program corresponding to commands to be executed on the digital measurement data in the USB transducer and commands to preset monitoring functions of said sensor, operation means for executing a selected process from the processes in the preset program for processing the digital measurement data according to a command received from said external computer, processing the digital measurement data from the A/D conversion means according to the selected process, and outputting the processed data, and a USB controlling means for receiving the processed data, transforming data format of the processed data and sending the transformed data to said external computer.

* * * * *